Patented Oct. 16, 1923.

1,470,929

UNITED STATES PATENT OFFICE.

YU CHEN LAI, OF NEW YORK, N. Y.

SESAME FLOUR AND PROCESS OF MAKING THE SAME.

No Drawing.    Application filed June 14, 1921.   Serial No. 477,611.

*To all whom it may concern:*

Be it known that I, YU CHEN LAI, a citizen of China, but not a citizen of the United States, and resident of New York city, in the county of New York and State of New York, have invented certain new and useful Sesame Flour and Processes of Making the Same, of which the following is a specification fully described on next pages.

The invention relates to sesame or gheemaar flour and the process of making the same, an object thereof being to produce by a novel process flour or the like from sesame or gheemaar seeds.

A further object of this invention is to produce a food product or ingredient from sesame or gheemaar seeds wherein substantially the entire seed is rendered useful and of commercial and economic value due to the utilization of a large part of the seed heretofore thrown away as waste.

A further object of this invention is to produce from sesame or gheemaar seed a flour or other useful product possessing certain important characteristics and qualities rendering such product susceptible of valuable and advantageous use in various ways, such for instance as a food ingredient or as a substance adaptable for combination or mixture with other food substances.

A further object of this invention is to produce from sesame or gheemaar seed a flour or analagous product formed, by virtue of the present process from both the oil and pulp of the seed Other objects of this invention will appear in the following description thereof, and it is of course understood that various changes may be made within the scope of the appended claims without departing from the spirit of the invention Heretofore, sesame or gheemaar seeds, which have been largely cultivated in southern China and other parts, have been used solely for the purpose of extracting the oil content therefrom to form a flavoring extract having a distinctive flavor and aroma. It is a known fact that these seeds generally have a content of about forty per cent of oil and about sixty per cent pulp. Thus, it has been the practice to utilize merely the oil extract from the seed and throw away the entire pulp as waste. It is a fact that this flavoring extract which has been produced from the oil extract of the sesame or gheemaar seed does not keep over a few months at a time as the extract has a tendency to deteriorate after standing a relatively short time. As a result thereof the advantages of the flavor and aroma from the oil extract have been limited due to the perishable nature of the extract.

By virtue of the present invention however, it is possible not only to utilize substantially the entire oil and pulp content of the seed but also the flavor and aroma thereof are increased or intensified, and the resulting product does not deteriorate in the respects heretofore pointed out.

In carrying out the present invention a quantity of sesame or gheemaar seed is placed in a suitable container or heating apparatus which may preferably be in the form of a mixer of any preferred construction, and the seed is then subjected to heat. The seed is preferably raised to the desired temperature in order to accomplish the cooking operation by gradually raising the temperature, and I have found in practice that a temperature of about 200° F. is satisfactory. The seed is preferably cooked in this manner in a substantially closed container so as to retain substantially the entire flavor and aroma, and of course it is understood that the seeds are mixed or stirred during the heating process.

After the seed has been heated or cooked to the proper extent, the same is permitted to cool slowly in a closed receptacle so as to retain substantially all the flavor and aroma of the seed. Thereafter the cooked seed is preferably ground or milled so as to produce a flour. It will thus be seen that this flour is composed of substantially the entire pulp and oil of the seed, while at the same time by virtue of the heating or cooking process the flavor and aroma of the seed are fixed and are rendered non-volatile. It is to be particularly noted that where the oil is extracted from the uncooked seed as heretofore and utilized as a flavoring and perfumed extract, the latter not only deteriorates within a few months but the pulp of the seed was valueless and could not be utilized readily for any known purpose. However I have discovered that by heating and cooking the pulp to a sufficient extent, the same can advantageously be ground and used as a nutritious and edible flour, which together with the oil content having a very desirable and distinctive flavor and aroma renders the resulting product of great value, particularly as food ingredient and adapted particularly to be mixed with other flours, for instance, to form a combined flour having useful and desirable qualities and characteristics.

Thus, sesame or gheemaar flour, made in accordance with the present improved process, may be used in various ways and may be combined with wheat flours, barley, rice, sugar, meals, nut flours, etc. I have found that about one thousand pounds of ordinary flour combined with about one hundred and fifty pounds of sesame or gheemaar flour will produce a flour of superior quality having a distinctive flavor and adapted for many useful cooking purposes. Of course it is understood that the herein mentioned uses of sesame or gheemaar flour have been indicated by way of illustration only as the extent of use thereof in many relations and combinations for cooking purposes for instance are almost unlimited.

It is to be understood that by sesame seeds is meant the seeds of the sesame plant, which are frequently termed geemar or gheemaar seeds in various places and particularly in China where cultivated to a large extent.

I claim as my invention:

1. The herein described process of making flour from the sesame seed, which consists in heating the seed to a temperature sufficient to cook the same and grinding the seed.

2. The herein described process of making flour composed of the pulp and oil of the sesame seed, which consists in heating the sesame seed to a relatively high temperature sufficient to cook the same, then permitting it to cool, and then grinding or milling the same.

3. The herein described process of making a product composed of the pulp and oil extract of the sesame seed, which consists in gradually heating in a partially closed vessel a quantity of sesame seed to a temperature sufficient to cook the same, then permitting the same to cool, and then grinding the cooked seeds.

4. A flour formed from the sesame seed.

5. A food ingredient in the form of a flour containing the cooked and ground pulp of the sesame seed.

Signed at 253 Lenox Avenue, New York city, in the county of New York and State of New York, this 28th day of May A. D. 1921.

YU CHEN LAI.